Sept. 2, 1969  R. L. JAMES  3,465,134
SOLID STATE MICROCIRCUIT INTEGRATOR SYNCHRONIZER SYSTEM
Filed July 23, 1965  6 Sheets-Sheet 4

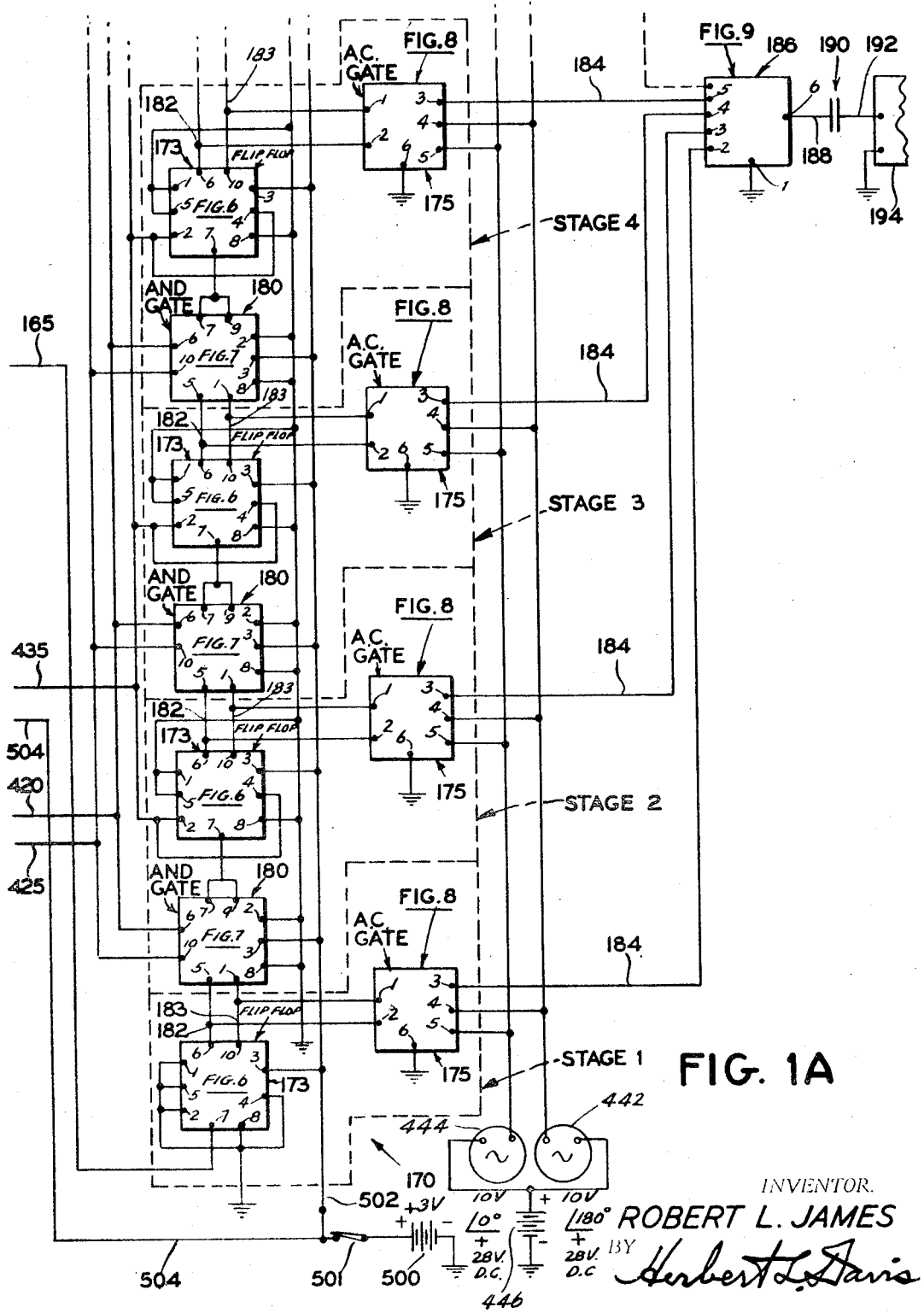

INVENTOR.
ROBERT L. JAMES
BY
ATTORNEY

ALTERNATING CURRENT GATES

*INVENTOR.*
ROBERT L. JAMES
BY
*ATTORNEY*

United States Patent Office 3,465,134
Patented Sept. 2, 1969

3,465,134
SOLID STATE MICROCIRCUIT INTEGRATOR
SYNCHRONIZER SYSTEM
Robert L. James, Bloomfield, N.J., assignor to The Bendix
Corporation, a corporation of Delaware
Filed July 23, 1965, Ser. No. 474,352
Int. Cl. G06g 7/18
U.S. Cl. 235—183                              19 Claims

ABSTRACT OF THE DISCLOSURE

An integrator-synchronizer system for an integrating and/or synchronizing operation on an alternating current input signal for effecting a train of pulses by a voltage to frequency converter which is in turn controlled by a direct current output signal from a hold circuit arranged to periodically sample an alternating current input signal.

---

The present invention relates to a solid state microcircuit integrator-synchronizer system and more particularly to a novel electrical system for providing an integrating and/or synchronizing operation on an alternating current input signal.

The means for effecting the aforenoted operation is an all solid state system having the advantage over previous systems of no gear trains, motor generators or other moving parts. In addition, there are advantages in the present invention of large reductions in weight and volume, reductions in cost, improvement of performance, and increased reliability.

An object of the invention is to provide a novel solid state network to obtain a voltage output which is an accurate mathematical integral of an alternating current input signal voltage applied thereto.

Another object of the invention is to provide a novel means to produce a train of pulses at a rate proportional to the magnitude of an input signal voltage and thereafter counting these pulses at counter-stages so as to produce an output voltage of a magnitude accurately proportional to the total count of these pulses.

Another object of the invention is to provide a novel means for effecting a train of pulses by a voltage to frequency converter which is in turn controlled by a direct current output signal from a hold circuit arranged to periodically sample an alternating current input signal.

Another object of the invention is to provide a novel means for sampling an alternating current input signal which is periodically applied through an operational amplifier selectively rendered effective once per cycle of the alternating current input and always when the input signal is at a peak of a sinusoidal wave.

Another object of the invention is to provide a capacitor at the output of the operational amplifier and arranged so as to be periodically charged by the passage of the sample output signal through the operational amplifier and thereafter apply a direct current output hold or signal biasing voltage to a voltage to frequency converter to provide pulses for operating a counter system.

A further object of the invention is to provide a novel counter-mechanism controlled through a voltage to frequency converter by the charge applied to the capacitor and including a novel means to effect an increase or decrease in the output voltage as required in the integrating process when the input signal polarity reverses.

Another object of the invention is to provide a system in which the output integration signal may be held indefinitely upon the alternating current input signal being reduced to a zero value.

These and other objects and features of the invention are pointed out in the following description in terms of the embodiments thereof which are shown in the accompanying drawings. It is to be understood, however, that the drawings are for the purpose of illustration only and are not a definition of the limits of the invention. Reference is to be had to the appended claims for this purpose.

In the drawings:

FIGURE 1 is a schematic wiring diagram of a solid state microcircuit integrator-synchronizer system embodying the invention and in which certain of the parts have been indicated by boxes, the circuit details of which are shown in the designated figures.

FIGURE 1A is a schematic wiring diagram showing a solid state microcircuitry counter-system to be operatively connected to the microcircuit integrator-synchronizer system of FIGURE 1 in which corresponding electrical conductors interconnecting the system of FIGURE 1 to the system of FIGURE 1A have been indicated by like numerals and in which certain of the parts have been indicated by boxes, the circuit details of which are shown in the designated figures.

FIGURE 2 is a timing chart showing graphically the wave forms of the electrical signals effected in the solid state microcircuit integrator-synchronizer system at the designated points.

FIGURE 3 is a detailed wiring diagram of operational amplifiers embodied in the system of FIGURE 1 designated by the numerals 112, 122 and 150 and which may be of type SN522 having the operational characteristics set forth in detail in a Bulletin No. DL–S 633,468, January 1963, of the Texas Instruments, Inc., and in which drawing of FIGURE 3 corresponding numerals indicate corresponding terminals for such amplifiers shown in the system of FIGURE 1.

FIGURE 4 is a wiring diagram of a dual transistor such as type 2N3048 described in Bulletin No. DL–S 634,208, August 1963, of Texas Instruments, Inc., and embodied in the boxes 117, 139 and 300 of the system shown in FIGURE 1 and in which drawing of FIGURE 4 corresponding numerals indicate corresponding terminals for such microcircuits shown in the system of FIGURE 1.

FIGURE 5 is a detailed wiring diagram of a clock driver type SN535 buffer network embodied in the boxes 160, 200, 320 and 410 of the system of FIGURE 1 and having the operational characteristics set forth in detail in a Bulletin No. DL–S 634,192, December 1963, of the Texas Instruments, Inc., and in which drawing of FIGURE 5 corresponding numerals indicate corresponding terminals for such networks shown in the system of FIGURE 1.

FIGURE 6 is a detailed wiring diagram of a bistable network type SN530 J–K flip-flop embodied in the box 210 of FIGURE 1 and the boxes 173 of FIGURE 1A and the operational characteristics of which have been set forth in detail in a Bulletin DL–S 634,187, December 1963, of the Texas Instruments, Inc. and in which drawing of FIGURE 6 corresponding numerals indicate corresponding terminals for such networks shown in the systems of FIGURES 1 and 1A.

FIGURE 7 is a detailed wiring diagram of the network in the "And" ga'es 180 embodied in the counter circuit of FIGURE 1A and which may be of a Diffused Silicon "And" or "Or" Logic Network Type SN534, the operational characteristics of which have been set forth in detail in a Bulletin DL–S 634,191, December 1963, of the Texas Instruments, Inc., and in which drawing of FIGURE 7 corresponding numerals indicate corresponding terminals for such ne'works shown in the counter-system of FIGURE 1A for the "And" gates 180.

Figure 1:
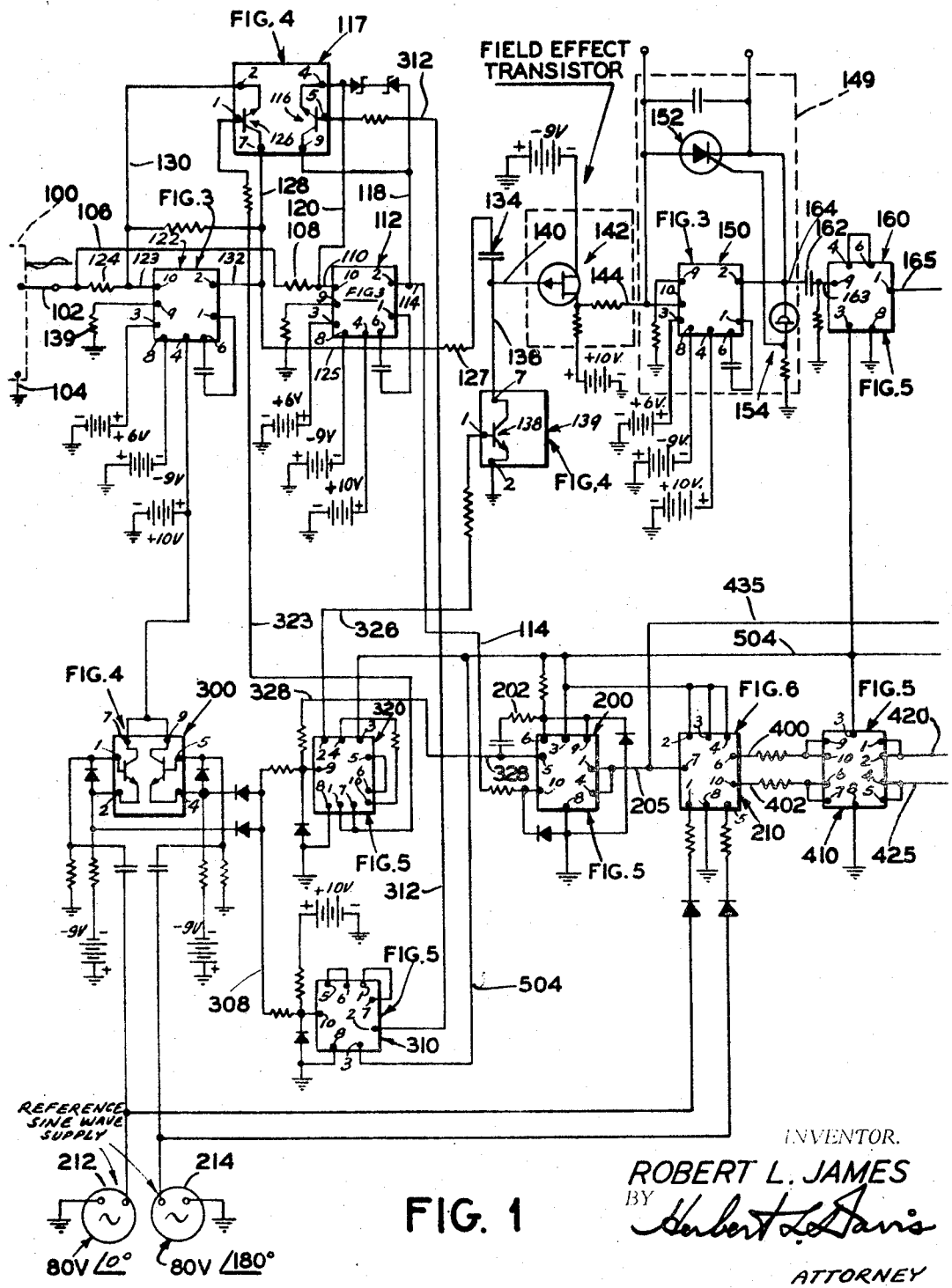

Referring to the drawing of FIGURE 1, there is indicated by numeral 100 a source of a variable amplitude alternating current signal having a constant frequency and a reversible phase. Such a signal may be provided by a synchro energized by a suitable source of alternating current and operated by an automatic pilot sensor. The resulting alternating current signal is applied across output conductors 102 and 104 and may be in the form of an alternating current sine wave, as shown by curve A of FIGURE 2, the amplitude of which is to be integrated by the circuitry shown in FIGURES 1 and 1A, and the phase of which may be reversed, as hereinafter explained in greater detail.

Figure 3:
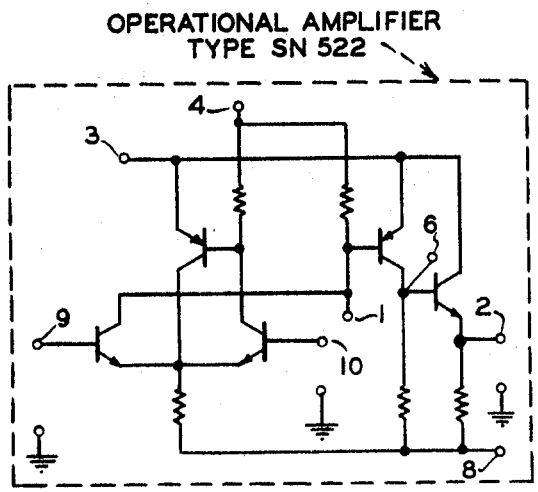

This alternating current signal is applied then through conductor 102, conductor 106, resistor element 108 and conductor 110 to an input terminal 10 of an operational amplifier 112 which is shown in detail in FIGURE 3. The operational amplifier 112 may be of a type SN522, the operational characteristics of which have been set forth in detail in the Bulletin No. DL–S 633,468.

The amplifier 112 is arranged to amplify the input signal of the waveform A applied to the input conductor 110 and therethrough to an output conductor 114 leading from an output terminal indicated by the numeral 2. Controlling the operation of the amplifier 112 is a normally conducting transistor 116 of a dual transistor microcircuit 117. The transistor 116 is connected by a conductor 118 from a collector terminal 9 to the output terminal 2 of the operational amplifier 112 and through a conductor 120 from an emitter terminal 4 to the input terminal 10 of the operational amplifier 112.

Figure 2:
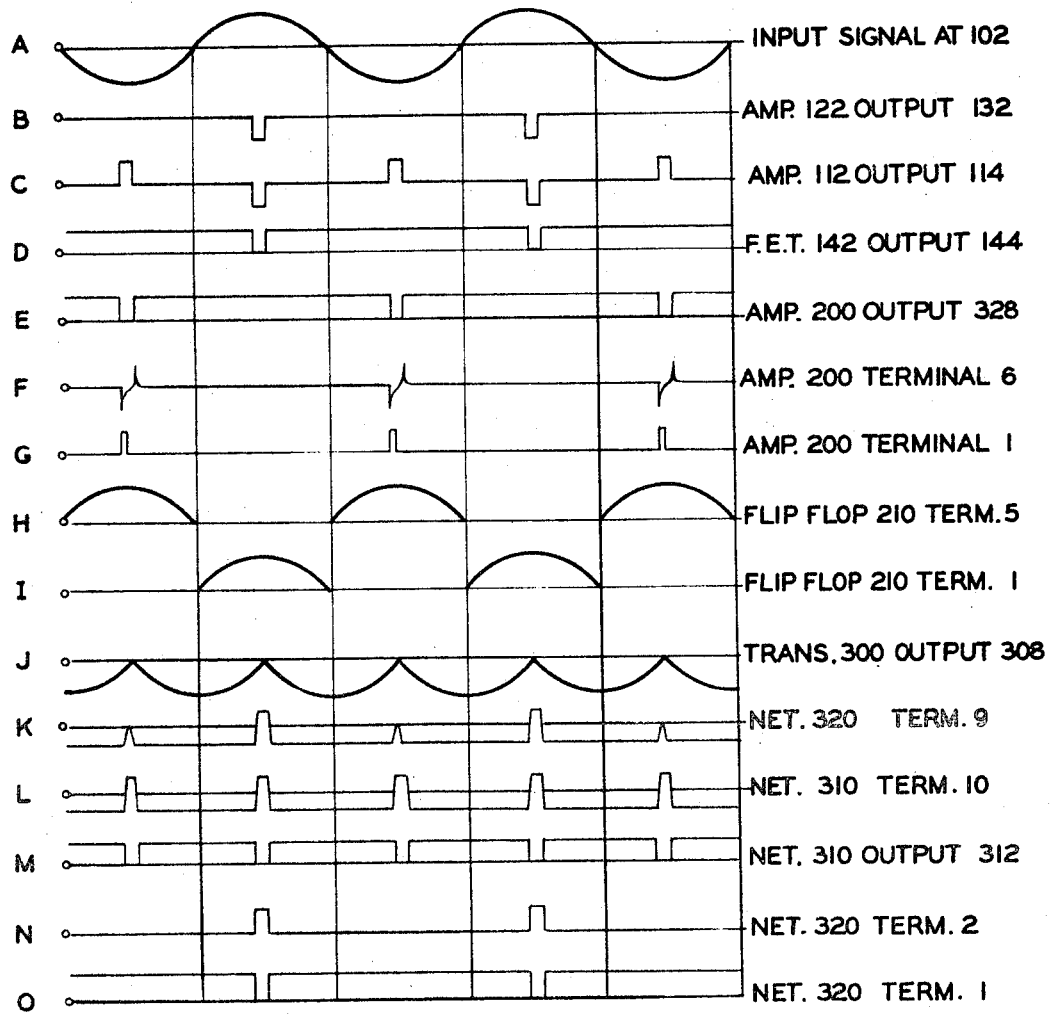

The operational amplifier 112 is effective to amplify the input signal of the waveform A applied thereto whenever the transistor 116 is gated open which is done at the positive and negative peaks of the input sine wave signal (or twice per cycle), as shown by the waveform C of FIGURE 2, so as to provide an output signal at conductor 114 which is indicative of a phase relation of the input signal at conductor 102.

A second operational amplifier 122 has an input terminal 10 connected by a conductor 123 and resistor 124 to the alternating current input signal applied to conductor 102 and an output terminal 2 connected by a conductor 132 to an output conductor 125. The amplifier 122, shown in FIGURE 3, may be of the type SN522, heretofore described, and is effective to pass the amplified signal from the input terminal 10 to the output terminal 2 thereof when gated open by the control action of the transistor 126 so as to provide an output signal at conductor 132 indicative of the peak amplitude of the input sine wave signal at conductor 102.

The transistor 126 is connected by a conductor 128 leading from a collector terminal 7 to the conductor 125 leading from the output terminal 2 of the amplifier 122 and through a conductor 130 leading from an emitter terminal 2 to the input conductor 123 leading to the input terminal 10 of the amplifier 122. The transistor 126 is a normally conducting transistor and when gated open is effective to render the amplifier 122 effective to amplify the signal applied to the input terminal 10 and therethrough to the output terminal 2 of the amplifier 122. The gating open of the transistor 126 causes the amplifier 122 to be effective only once per cycle of the input signal, as shown by the waveform B of FIGURE 2. This sampling of the signal peaks of the input signal of the waveform A of FIGURE 2 is effective to produce a quadrature rejection, since the quadrature component of the input signal is zero at the sampling times, and hence makes no contribution to the output of the amplifier 122.

Figure 4:
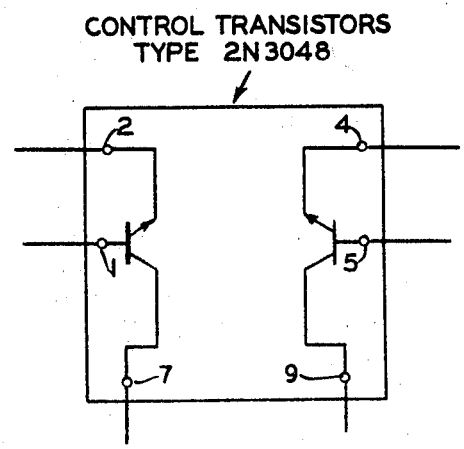

The output of the amplifier 122 having the waveform B, of FIGURE 2, passes from the output terminal 2 thereof through the output conductor 132, conductor 125, resistor 127 and coupling capacitor 134 to a conductor 136 and thereby to an input terminal 7 of a transistor 138 of a dual transistor microcircuit 139, such as shown by FIGURE 4, so as to effect a charging of the capacitor 134 upon the transistor 138 being closed to ground. However, upon the transistor 138 being periodically opened, as hereinafter explained, the capacitor 134 applies a direct current output hold or biasing voltage signal through a conductor 140 leading to a gate element in the input of a field effect transistor indicated generally by the numeral 142.

The hold capacitor 134 has one plate periodically connected through the transistor 138 to ground (causing it to charge rapidly to the full output of the amplifier 122) by the action of the transistor 138 which is gated closed at the same time as the amplifier 122 is gated open by the action of the transistor 126, as heretofore explained.

With the capacitor 134 now charged to the value of the output applied through conductor 132 by the operational amplifier 122 and having the waveform B of FIGURE 2, the transistor gate 138 periodically opens freeing that side of the capacitor 134 from ground while at the same time the operational amplifier 122 is gated closed by the action of the transistor 126 thereby connecting the other side of the capacitor 134 through resistor 127 to terminal 2 of the operational amplifier 122 which terminal 2 is then at a virtual ground level due to the feedback action of the amplifier 122, the circuitry of which is shown by FIGURE 3. The charge on capacitor 134, equal to the amplitude of the signal previously applied from the operational amplifier 122, now is connected across the input of the field effect transistor 142 where it remains held undiminished in amplitude until a similar sampling occurs in the next cycle of the input signal having the waveform A of FIGURE 2.

The field effect transistor 142 connected as a source follower transfers this held DC signal at the capacitor 134 from its input at a very high impedance level to its output at conductor 144 at a very low impedance level. Because of this high input impedance level in the field effect transistor 142, the charge on the capacitor 134 does not have time to leak off between samplings and so produces no ripple in the D-C output signal at the conductor 144 of the field effect transistor 142.

Next, this D-C signal at the field effect transistor output line 144 having the waveform D of FIGURE 2 controls the frequency of the unipolarity constant amplitude pulses produced at an output conductor 164. The voltage to frequency converter 149 includes an operational amplifier 150, silicon controlled rectifier 152 and tunnel diode 154. The converter 149 provides at an output conductor 164, a series of constant amplitude pulse signals having a frequency which is proportional to the amplitude of the direct current signal applied at the input 144 of the converter 149. The operation of the converter 149 is described in a copending U.S. application patent Ser. No. 424,584, filed Jan. 11, 1965, by Robert L. James, and assigned to The Bendix Corporation.

The operational amplifier 150 included in the converter 149 may be of a solid circuit semi-conductor network type SN522 heretofore described and shown in FIGURE 3. The output from the voltage to frequency converter 149 is applied to an input terminal 9 of a clock driver buffer network indicated generally by the numeral 160.

Figure 5:
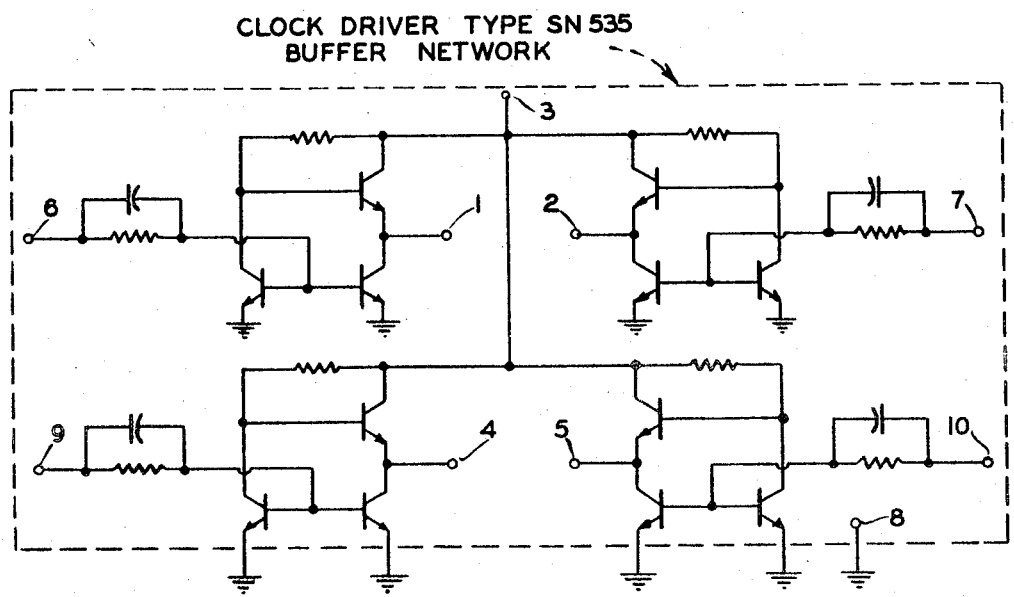

The network 160 may be of the Diffused Silicon Clock Drive SN535 Buffer Network of FIGURE 5, as heretofore described, and including four independent single stage transistor amplifiers, two of which, connected in tandem, are used to amplify and "square-up" the pulse output of the voltage to frequency converter 149 applied at output conductor 164. This pulse output is applied by a coupling capacitor 162 and input conductor 163 to the input terminal 9 of the network 160. The pulses of this amplified pulse train from the network 160 are applied by an output conductor 165 to an input terminal 7 of a first stage bistable network 173 of a multi-stage Binary Up-Down Counter indicated generally by the numeral 170 in FIGURE 1A.

Figure 6:
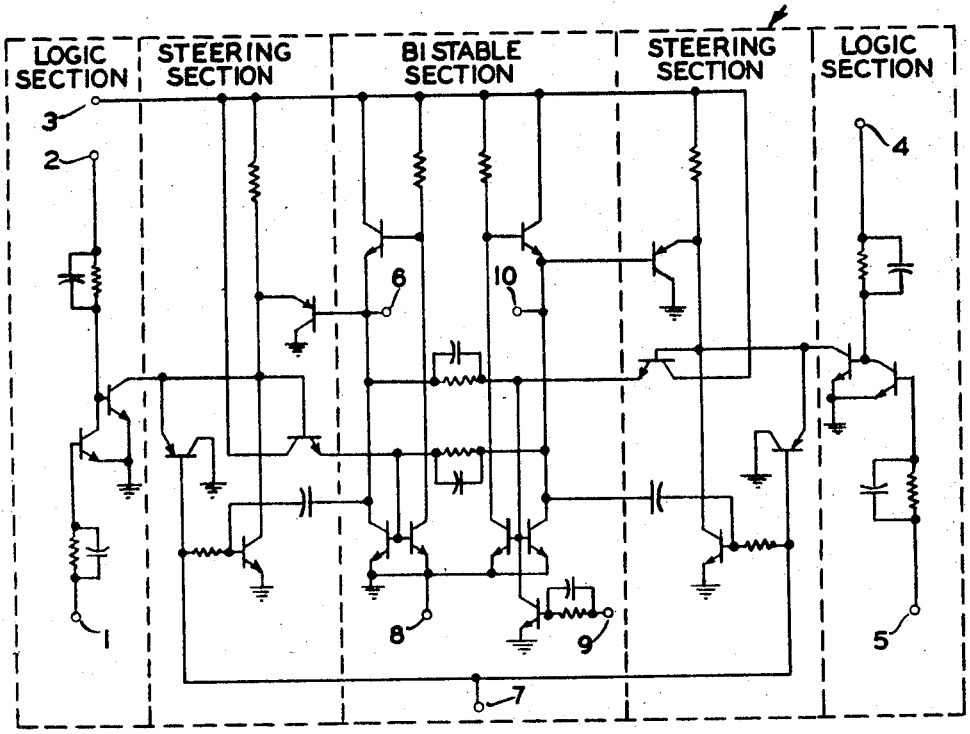
Figure 8:
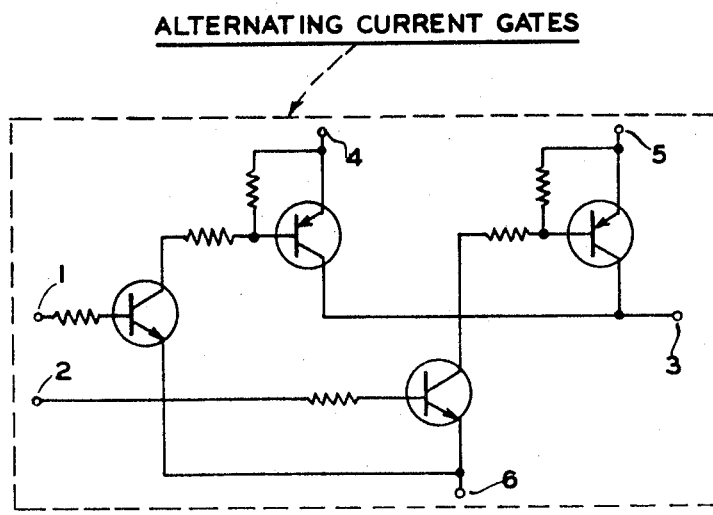
FIGURE 8 is a detailed wiring diagram of the alternating current gates 175 of conventional type shown in the counter network of FIGURE 1A.

First, second, third and fourth counter stages of the multi-stage counter 170 are shown in FIGURE 1A. The first counter stage includes a bistable network 173, as shown in FIGURE 6, which may be of a diffused silicon bistable network type SN530 J-K Flip-Flop, the operational characteristics of which have been set forth in detail in a Bulletin No. DL–S 634,187, December 1963, of the Texas Instruments, Inc. There are operatively connected to the output terminals 6 and 10 of each bistable network 173 conductors 182 and 183 leading to terminals 2 and 1, respectively, of alternating current gates 175 which may be of a conventional type such as shown by FIGURE 8.

Figure 7:
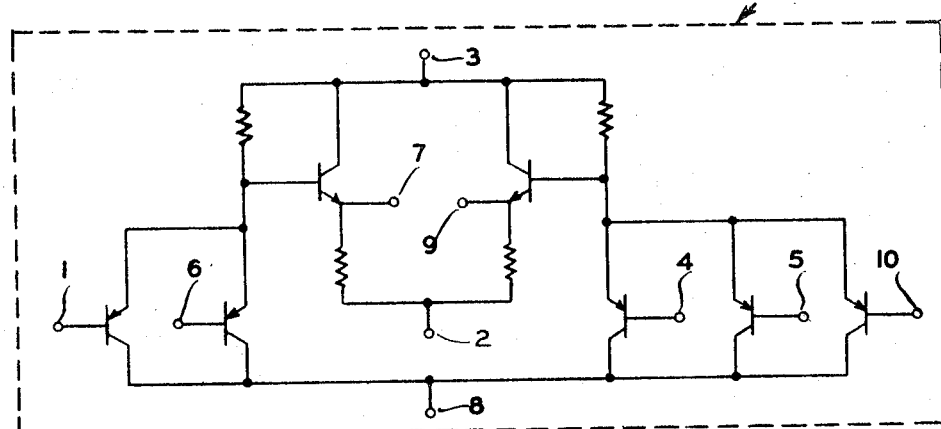

The second, third and fourth counter stages include not only a bistable network corresponding to the network 173 and alternating current gates corresponding to the gates 175 but also "And" gates 180 which may be of a type SN534 diffused silicon "And" or "Or" logic network, as shown by FIGURE 7, the operational characteristics of which have been set forth in detail in a Bulletin No. DL–S 634,191, December 1963, of the Texas Instruments, Inc.

Figure 9:
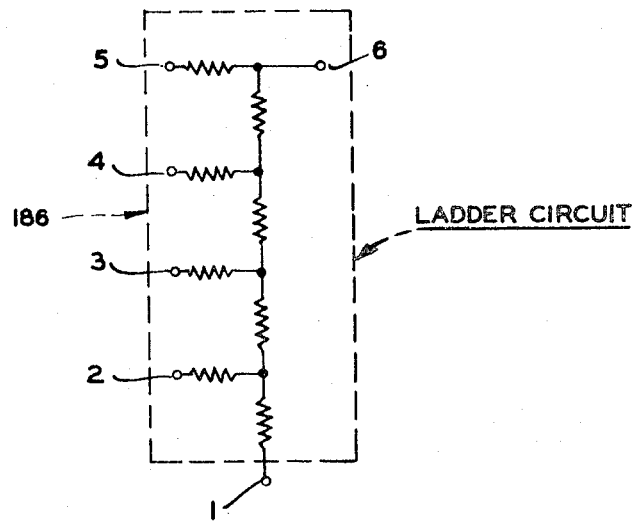
FIGURE 9 is a detailed wiring diagram of the ladder circuit of conventional type embodied in the box 186 of the counter network of FIGURE 1A.

Each of the counter-stages have output conductors 182 and 193 leading from terminals 6 and 10 of the bistable network 173 and operatively connected so as to control a dual A-C gate shown in the block diagram of FIGURE 1A and indicated by the numeral 175. The wiring diagram of the A-C gate 175 is shown in detail in FIGURE 8 in which corresponding terminals have been indicated by corresponding numerals to those shown on the A-C gate 175 of FIGURE 1A. The outputs from the counters when applied across the lines 182 and 183 cause the A-C gate 175 to pass either an in-phase or out-of-phase constant amplitude A-C reference voltages (phase being relative to the input A-C signal) from a common output terminal 3 of each A-C gate 175 through output conductors 184 to input terminals 2, 3, 4 and 5 of a multi-stage resistance ladder attenuator 186 which is shown in circuit detail in FIGURE 9. Corresponding terminals of the ladder circuit of FIGURE 9 have been indicated by corresponding numerals to those shown for the ladder circuit 186 of FIGURE 1A.

The pulse count of the binary counter appears as an analog A-C voltage output at terminal 6 from the ladder attenuator 186 in accordance with the operation of conventional type digital to analog converters well known in the art. The A-C voltage output at the output line 188 is coupled through a coupling capacitor 190 to an input line 192 of a suitable indicator or other suitable mechanism 194 to be operated thereby and the amplitude of the coupled voltage is proportional to the total input pulse count from the start of the pulses up to the time being considered.

Consequently, where before we had the pulse frequency proportional to the amplitude of the input signal, or $$(\text{I}) \frac{dn}{dt} = k(e_i)$$

and now, as just explained, we have the amplitude of the A-C output signal from the ladder attenuator proportional to the total pulse count, N $$\left(\text{where } N = \int_0^T \left(\frac{dn}{dt}\right) dt\right) \text{ or (II) } |e_0| = k^1 \int_0^T \left(\frac{dn}{dt}\right) dt$$

Thus, substituting Equation I in Equation II, it follows that the amplitude of the output A-C voltage is proportional to the integral of the amplitude of the input signal, or $$(\text{III}) \ |e_0| = k^1 k \int_0^T |e_i| dt$$

This discussion now has shown that the output of the system is in fact the integral of this input (disregarding polarity of the input signal).

Next, in order that this integration process also take into account the polarity of the input signal as well as its amplitude, provision was made for the counter to count up (increase its count) when the input signal was of one A-C polarity and to count down (decrease its count) when the input signal reversed its phase. This then required that the output voltage expressed by Equation III as the integral of this polarity reversible input voltage also be able to reverse its phase. This latter requirement was met by providing polarity reversible A-C outputs instead of on-off outputs from the A-C gate 175 mentioned above.

The foregoing up and down counting capability required above was accomplished as follows: the multistage binary counter of the present invention counts up (adds to its count) or counts down (subtracts from its count) depending only on which of the two outputs 182 or 183 of a preceding counter flip-flop stage 173 is connected to the input of the succeeding stage. It is necessary then merely to connect the input of each counter flip-flop 173 to one or the other complementary output of the preceding counter stage 173.

In the present invention this is effected by utilizing a dual "And" circuit such as that shown in FIGURE 7 which is connected between each counter binary flip-flop 173.

The "And" gate circuit 180, shown in detail in FIGURE 7, serves as a single pole double throw switch, the condition of the switch being determined by which of its input terminals 6 or 10 receives a (+) D-C signal level from the output lines 420 or 425 of the controlling circuitry of FIGURE 1, as hereinafter explained, and which receives a zero signal level. How this circuit operates internally may be readily seen from the circuitry of FIGURE 6, as explained in the aforenoted published literature for the type SN534 diffused silicon "And" or "Or" logic network. These D-C control signals for the respective "And" gates 180 controlling the up or down counting are obtained through the control circuitry of FIGURE 1, as hereinafter explained.

COUNTER CONTROL

First, the sensing of input signal polarity is effected through the operation of the signal amplifier 112 heretofore described. The high gain of this amplifier 112 provides full output for minimum threshold values of the input signal applied at the input line 102. The output signal pulse applied at output terminal 2 of the amplifier 112 (two per cycle), one plus and one negative, as shown in the waveform C of FIGURE 2, is then transmitted through output conductor 114 to input terminal 10 of the four single stage amplifier 200, which may be of a type SN535 diffused silicon clock driver buffer network shown in detail by FIGURE 5, the operational characteristics of which have been set forth in detail in a Bulletin No. DL–S 634,192, December 1963, of the Texas Instruments, Inc. The first of these amplifiers (between terminals 10 and 5 of the amplifier 200), having a zero bias on the base of its input transistor, can amplify or "square-up" only positive input pulses of this incoming signal. Input and output waveforms at terminals 10 and 5, respectively, of the network 200 are shown at C and E of FIGURE 2.

As shown by the wiring diagram in FIGURE 1, the output of terminal 5 of the network 200 of the waveform E of FIGURE 2 passes through a resistance-capacitor differentiator 202 to provide a wave of the form F at the input terminal 6 of a second amplifier of the clock driver buffer network 200, the circuit of which is shown at FIGURE 5. The negative pulse from this differentiator 202 is squared-up by the second amplifier of the network 200 to provide an output wave at terminal 1 of the network 200 of the form shown by G of FIGURE 2. The negative instead of the positive pulse was amplified here because of a positive bias applied from battery 500 through conductor 504 to the terminal 6 of the amplifier 200.

A third amplifier between terminals 9 to 4 of the network 200 of FIGURE 5 is connected in parallel with the second amplifier of the network 200, heretofore described, so as to increase "fan out" or load carrying capability of these two amplifiers. The output pulse train (positive) from the terminals 1 and 4 of the network 200 and applied through the conductor 205 provides a clock pulse input at the terminal 7 of the flip-flop 210, the circuit of which is shown in FIGURE 6, and which may be of a diffused silicon bistable network type SN530, the operational characteristics of which have been set forth in detail in Bulletin No. DL-S 634,187, December 1963, of the Texas Instruments, Inc.

These output pulses from the network 200 and applied to conductor 205 provide a wave of the form G of FIGURE 2 of which there is one pulse per cycle with the half cycle in which the pulse occurs being shifted whenever the input signal to the system reverses its phase. This is because only positive signal pulses can effect the network 200 and produce clock pulses as mentioned before.

Also applied to the J-K flip-flop 210, shown in the block diagram of FIGURE 1 and in detail in FIGURE 6, are two (+) half wave rectified sine pulses made from in-phase and out-of-phase reference alternating current supplies 212 and 214. These (+) half cycle sine pulses occurring in alternate half cycles are applied to terminals 1 and 5 of the flip-flop 210 so as to provide waveforms I and H of FIGURE 2.

Study of the circuit of internal connections of the flip-flop 210 of FIGURE 6 will show that for terminal 6 to be a "one" (or + D-C output level), a (+) voltage at terminal 5 and a zero voltage at terminal 1 must exist when clock pulses applied through conductor 205 appear at terminal 7 of the flip-flop 210. Contrarily, for a "one" to appear at output terminal 10 of flip-flop 210, a (+) voltage at terminal 1 and a zero voltage at terminal 5 must exist when clock pulses appear at terminal 7.

From what has been said and the waveforms of H and I of FIGURE 2, it can be seen that clock pulses from 200 will occur always when terminal 5 of the flip-flop 210 is (+) and terminal 1 is zero so as to cause terminal 6 of the flip-flop 210 to be a "one" when signal input to the system is of the phase shown by waveform A of FIGURE 2. However, when the signal phase reverses causing a half cycle shift in position of the clock pulses, that terminal 1 of the flip-flop 210 will be (+) and terminal 5 of the flip-flop 210 will be zero for each clock pulse occurrence. Now, output terminal 10 of flip-flop 210 will switch to (+) and terminal 6 of flip-flop 210 will become zero (the reverse of what they were before). Thus the control of the up-down signal levels from the flip-flop 210 will be effected by the polarity of the input signal to the system.

It will be noted that the clock pulses from the network 200 also are connected through conductor 435 to terminals 2 and 4 of each Type SN530 J-K flip-flop microcircuit 173 used in the digital to analogue converter (except for the first stage where up-down control is not applied). The purpose of this is for the clock pulses to act as inhibit pulses to prevent false triggering of these flip-flops 173 when the SN534 dual "And" gate circuits of FIGURE 7 are commanded to change state by the up-down control signals applied through conductors 420 and 425. A study of the internal circuitry of the flip-flop 173 which may be of the type SN530 shows that when the inhibit pulse makes terminals 2 and 4 (+) and since terminals 1 and 5 are connected permanently at ground (zero voltage), there will be no change of state of the flip-flop, even in the presence of a false clock pulse. Such a pulse could be delivered at this time from the preceding dual "And" circuit when it changes state in response to up-down commands (as mentioned before). When the inhibit pulse ends, the flip-flop 173 is returned to a normal uninhibited operating condition for counting signal pulses coming from the voltage to frequency converter 149. Thus, the inhibit pulse prevents up-down command signals from causing false triggering of the counter stages 170.

Next, it remains to be explained how the gating pulses are generated that operate the transistor gates 116 and 126 for the amplifiers 112, 122 and the transistor gate 138 of the hold circuit. In this connection, the transistor gate 116 connected across terminals 2 and 10 of amplifier 112 requires a gating pulse twice each cycle of the signal, see the waveform C of FIGURE 2. In order to obtain the required pulse train, dual transistor microcircuit 300 of FIGURE 4 is connected as two emitter followers so as to deliver at its terminals 2 and 4 two out-of-phase 90° phase shifted sine waves made by phase shifting 0° and 180° constant voltage reference sine wave inputs. These 90° out-of-phase sine wave outputs of the emitter followers are full wave rectified and the resulting (—) D-C voltage having a waveform J of FIGURE 2 is applied to conductor 308 and has added thereto a (+) D-C fixed bias at the input terminal 10 of the four signal stage amplifier microcircuit 310 which may be of the SN535 type shown in detail at FIGURE 5. Because of the D-C (+) bias, the return to zero of the (—) wave rectified waveform twice each cycle causes (+) pulses of current twice each cycle to enter the transistor base at 10 of the first amplifier of the network 310, as shown by FIGURE 5. See waveform L of FIGURE 2. This pulse train is amplified by three cascaded amplifiers in the network 310 to square-up these input pulses and provide the desired pulse polarity at the output terminal 2 of the network 310 to provide the waveform M of FIGURE 2, applied through output conductor 312 of the network 310 to the base terminal 5 of the transistor 116 of the microcircuitry 117.

The other gating transistor 126 contained in the microcircuit 117 of FIGURE 4 it will be recalled requires a gating pulse at its base terminal 1, once each cycle. However, this gating pulse must shift one half cycle whenever the signal polarity reverses phase in order to always sample (—) peaks of the signal output at conductor 132 of the amplifier 122. This latter requirement is needed to cause the D-C signal output of the FET source follower circuit 142 to always be (+) in order to properly drive the voltage to frequency converter of 149. To obtain this 180° shift of pulse position when signal phase reverses, the same (—) full wave rectified wave of the form J of FIGURE 2 from the microcircuit 300 is applied to conductor 308 and thereby to the terminal 9 of the network 320, but instead of adding to this a (+) fixed bias as in the case of the signal applied to terminal 10 of the network 310, the pulse output from terminal 5 of the amplifier 200 of the form E is added instead to the terminal 9 of the network 320 through a conductor 328, together with the rectified wave of the form J applied from the transistor 300 through conductor 308 to the terminal 9 of the network 320.

Therefore, whenever a return to zero has occurred together for both the full wave rectified voltage applied through conductor 308 and the pulse output at the conductor 328 leading from terminal 5 of the amplifier 200 (waveforms J and E respectively of FIGURE 2), no resultant voltage pulse is produced to drive the four amplifier microcircuit 320 of FIGURE 5.

In the next half cycle, however, only the (—) full wave rectified waveform will return to zero, the output at terminal 5 of amplifier 200 now being high (+). The waveform of the voltage at the input terminal 9 of the amplifier 320 is shown at K of FIGURE 2. For this half cycle the amplifiers of 320 then produce an output pulse. This action repeats during subsequent half cycles producing a train of pulses at output terminals 1 and 2 of the amplifier 320 indicated by the waveforms O and N respectively of FIGURE 2 and which occur at a rate of one per cycle. See FIGURE 2 for waveform O of pulses applied at terminal 1 of the network 320 and to the base terminal 1 of transistor 126, through conductor 323 leading from output terminals 1 and 7 of the amplifier 320.

Since the pulse output at terminal 5 of amplifier 200 shifts phase 180° upon reversal of signal phase, this causes a similar shift of phase of the output pulse at the output terminals 1 and 2 of the amplifier 320. Therefore, these pulses always occur at the negative peaks of the signal even when this signal reverses phase. This was the requirement for the gating transistor 126 of amplifier 122.

A third gating pulse was required. This pulse was needed to turn on the transistor of 138 used to connect one side of the capacitor 134 to ground whenever the amplifier 122 is gated open. Therefore, this pulse simply is the inverse of the pulse just discussed for the gating transistor 126 of amplifier 122. Hence, this third pulse is obtained from an inverse output (terminal 2) of amplifier 320 and applied through a conductor 326 to base terminal 1 of transistor 138. See waveform N of FIGURE 2 for the form of the gate pulse applied at terminal 2 of the network 320 and through conductor 326 to the base terminal 1 of transistor 138. Since this inverted pulse has one more stage of amplification than does the gate pulse applied at terminal 1 of the network 320 and through conductor 323 to the terminal 1 of transistor 126, it straddles this latter pulse in time duration. This is desirable to prevent "race" problems in the sampling and hold function.

The dual A-C gate circuit 175 of the digital to analog converter mentioned before needs some further discussion. The block diagram of this circuit is shown in FIGURE 1A while the detail circuitry of the A-C gate circuit is shown at FIGURE 8 in which two output transistors have their collectors tied to a common output terminal 3 and have their bases driven, one always on when the other is off, by two common emitter amplifier transistors which in turn are driven at their bases by complementary flip-flop outputs applied through conductors 182 and 183 of the counter stage. In-phase 0° and out-of-phase 180° alternating current constant reference voltage sources 442 and 444, respectively, are connected to the terminals 4 and 5 of the A-C gates 175 and thereby to the emitters of these two output transistors which then act as gates to switch either the 0° or 180° reference A-C voltage to the output terminal 3 of the A-C gates 175. In series with each of the A-C reference voltages applied to the emitters of these output transistors is a D-C voltage source 446 used to prevent the reference A-C voltage excursions from ever driving the emitters of the output transistors negative with respect to ground. Regardless of this series D-C bias voltage, the output transistors still must be capable of blocking large inverse A-C voltage which occurs from an internal A-C voltage loop.

Referring to FIGURES 1A and 8, when one output transistor is conducting, because of this conduction, the other output transistor has applied to its collector and emitter an inverse A-C voltage which is the sum of the voltages applied to the two emitters, (these voltages being 180° out-of-phase with each other). To prevent breakdown from this inverse voltage, symmetrical type transistors are used for these output transistors of the alternating current gates 175 of FIGURE 8. This type of transistor, when turned off at its base, will block collector to emitter voltage equally well in either direction. An alternative method of blocking this inverse voltage would be to use a diode in series with each collector of the output transistors. Then, the transistors would not have to be symmetrical, but the resulting diode voltage drops and offset voltages (which vary with ambient temperature) then could produce inaccuracies in the digital to analog conversion process. A single pair of diodes, one in series with each A-C voltage source, will be seen to be insufficient for blocking internal inverse voltage loops of all stages of the digital to analog converter at one. Instead, two diodes are needed for each stage. This complexity adds to the component count and reduces reliability.

The ladder network 186 of the digital to analog converter is of a conventional design and needs no explanation to persons well versed in the art.

SUMMARY OF PURPOSE AND MODE OF OPERATION

The purpose of the circuitry shown by FIGURES 1 and 1A is to obtain a voltage output at 192 which is an accurate mathematical integral of a signal voltage at input terminal 102. This is effected by first producing a train of pulses at 165 having a rate proportional to the magnitude of the input voltage at terminal 102 and thereafter counting these pulses at the counter stages 170 and producing the output voltage at 192 such that it is proportional to the total count of these pulses.

The train of pulses at 165 are produced by the voltage to frequency converter 149 which is in turn controlled by the direct current output signal at line 144 from a hold circuit including the field effect transistor 142 and the charging or holding capacitor 134. The capacitor 134 is in turn controlled by the sampled output at line 125 leading from the output at terminal 2 of the operational amplifier 122 and having the waveform B of FIGURE 2.

The output from the operational amplifier 112 applied to line 114 leading from terminal 2 thereof and having the waveform C of FIGURE 2 is in turn connected through conductor 114 to the input terminal 10 of the clock driver buffer network 200 which provides outputs at terminals 1 and 5.

The output at terminal 5 of the network 200 having the waveform E of FIGURE 2, is applied through an output conductor 328 to a terminal 9 of the clock driver buffer network 320 to control the network 320 so as to produce output pulses at terminals 1 and 2 of the network 322 of the waveform O and N respectively.

The output pulse at terminal 1 is applied through an output conductor 323 to the base terminal 1 of the transistor 126 to render it conductive once per cycle and always when the input of the operational amplifier 122 of the waveform A is going positive.

The output pulse at terminal 2 of the network 320 is applied through an output conductor 326 to the base terminal 1 of the transistor 138 to render it conductive at the same time that transistor 126 is rendered non-conductive.

This action of the transistor 126 serves to cause the operational amplifier 122 to periodically pass or sample the input signal of the waveform A of FIGURE 2 upon the transistor 126 becoming non-conductive, while the transistor 138 in becoming conductive grounds one side of the charging capacitor 134 so that it is charged by the passage of the sampled input signal of the waveform A through the operational amplifier 122.

The output from the terminal 1 of the clock driver buffer network 200 of the waveform G of FIGURE 2 is applied through the output conductor 205 to input terminal 7 of the J-K flip-flop 210 of the circuitry of FIGURE 6 so as to control the output states (zero or one, or ground or plus) of the output terminals 6 and 10 of the flip-flop 210. These output terminals 6 and 10 are in turn connected by output conductors 400 and 402 to input terminals 9–10 and 6–7 of an amplifier or second clock driver buffer network 410 which may be of the type SN535 diffused silicon clock driver buffer network, shown in detail by FIGURE 5 and heretofore described. The amplifier network 410 has output terminals 1–2 and 4–5 connected respectively to output conductors 420 and 425 leading to the control terminals 6 and 10 of the "And" gates 180 of the counter stages 2, 3 and 4, as shown by FIGURE 1A. The arrangement of the flip-flop 210 is such that the phase relationship between the outputs of the alternating current references sources 212 and 214 and the pulses applied at line 205 will determine whether the output terminal 6 becomes positive or ground and vice versa for output terminal 10 of the flip-flop 210.

These states at the output terminals 6 and 10 of the flip-flop 210 will in turn determine whether the counting action of the counter stages 170 increases or decreases its total count. The clock driver buffer network 410 amplifies the output applied at the terminals 6 and 10 to control the counter stages 170 through output conductors 420 and 425.

There also leads from the output conductor 205 a conductor 435 which is connected to the counter stages 170 at the terminals 2 and 4 of each flip-flop 173 in the stages 2, 3 and 4 succeeding the stage 1 so as to prevent false triggering of these flip-flops whenever a change from up to a down counting stage or the reverse occurs. This might otherwise occur due to the outputs of the conductors 420 and 425 in controlling the "And" gates 180 in the output stages which could give a false count in each flip-flop 173 other than in the first stage.

The up and down counting action and hence increase and decrease voltage at 192 is required in the integrating process when input signal polarity reverses.

In the novel system of the present invention, the output integral signal may be held indefinitely upon the input signal returning to a zero value due to the fact that the output voltage is produced by the states of the several flip-flops 173 of all the counter stages and which are infinite memory devices which remain energized so long as the direct current supply voltage is effectively connected to the system. A battery or other suitable source of direct current 500 is connected through an operator-operative switch 501 to lines 502 and 504.

The line 502 leads to terminals 3 of the flip-flops 173 which may be of the bistable network type SN530 J-K flip-flop heretofore described and shown by the circuit diagram of FIGURE 6; and to terminals 3 of "And" gates 180 which may be of the "And" or "Or" logic network type SN534 heretofore described and shown by the circuit diagram of FIGURE 7. The line 504 leads to the terminals 3 of the amplifier network 160, 200, 310, 320 and 410 and the flip-flop 210.

The constant voltage alternating current reference sources 442 and 444 are so operated as to provide an identical alternating current output frequency to that of the constant voltage alternating current reference sources 212 and 214 which are also so operated as to provide an identical alternating current output frequency to that of the constant frequency variable amplitude signal provided at the output of the signal source 100 as shown graphically by the waveforms A, H and I of FIGURE 2.

Although only one embodiment of the invention has been illustrated and described, various changes in the form and relative arrangement of the parts, which will now appear to those skilled in the art, may be made without departing from the scope of the invention.

What is claimed is:

1. Means for effecting an output of a magnitude proportional to a mathematical integral of the amplitude of an alternating current sinusoidal input signal; comprising means for amplifying the alternating current input signal, a first control means selectively operable in one sense for rendering the amplifying means effective to amplify and thereby sample the input signal, said first control means selectively operable in another sense for rendering the amplifying means ineffective, a capacitor means, a second control means selectively operable in one sense to operatively connect the capacitor means in an output of the amplifying means, the second control means selectively operable in said one sense for permitting the capacitor means to be charged by the output of the amplifying means, said second control means selectively operable in another sense for holding the charge on the capacitor means and to apply a biasing signal voltage corresponding to the held charge, means for operating said first and second control means in synchronism in said one sense at a peak of the sinusoidal signal once for each cycle of the input signal, voltage to frequency converter means, and means operatively controlled by the biasing signal voltage effected by the held charge on the capacitor means to render the converter means effective to provide a series of constant amplitude output pulse signals having a frequency proportional to the amplitude of the held charge on the capacitor means.

2. The combination defined by claim 1 including means for algebraically summing the output pulse signals provided by the voltage to frequency converter means so as to provide an output of a magnitude proportional to a mathematical integral of the amplitude of the input signal.

3. The combination defined by claim 2 including another means for amplifying the alternating current sinusoidal input signal, a third control means selectively operable in one sense for rendering the other amplifying means effective to amplify and thereby sample the input signal, said third control means selectively operable in another sense for rendering said other amplifying means ineffective, means for operating said third control means in said one sense at positive and negative peaks of the sinusoidal input signal so as to cause said other amplifying means to provide an output signal indicative of a phase relation of the input signal, means operative by the phase indicative output signal of the other amplifying means to control operation of the summing means in predetermined positive and negative senses dependent upon the phase relation of the sinusoidal input signal.

4. Means for effecting an output of a magnitude proportional to a mathematical integral of the amplitude of an alternating current sinusoidal input signal of reversible phase; comprising first means for sampling the alternating current input signal to provide a sample voltage, first control means for periodically rendering the first sampling means effective, a voltage to frequency converter means responsive to the sample voltage provided by said first sampling means to provide output pulses of a frequency proportional to the amplitude of the sample voltage, second means for sampling the alternating current input signal to provide another sample voltage, second control means for periodically rendering the second sampling means effective to sample the input signal, phase sensing means operatively connected in the output of the second sampling means to provide an output control signal of one sense upon the sinusoidal input signal being of one phase and an output control signal of an opposite sense upon the sinusoidal input signal being of an opposite phase, a counter means, means operatively connecting the signal pulses at the output of the voltage to frequency converter to the counter means, other means operatively connecting the control signals from the phase sensing means to the counter means so as to render the counter means selectively effective in a sense dependent upon the phase relation of the sinusoidal input signal and to provide said first mentioned output.

5. The combination defined by claim 4 including means operative in synchronism with the sinusoidal input signal for controlling the first and second control means.

6. Means for effecting an output of a magnitude proportional to a mathematical integral of the amplitude of an alternating current sinusoidal input signal of reversible phase; comprising a first operational amplifier means having an input connected to the alternating current sinusoidal input signal and an output, a first control means connected across the input and output of the first operational amplifier means and effective to selectively connect the first operational amplifier means in and out of operative relation for sampling the alternating current sinusoidal input signal at a peak of the sinusoidal signal once for each cycle thereof, a capacitor means operatively connected to the output of the first operational amplifier means, a second control means connected in a charging circuit for the capacitor means, said second control means being selectively operable in one sense to render the charging circuit effective to charge the capacitor means from the output of the first operational amplifier means, said second control means being selectively operable in a second sense to render a holding circuit effective to hold the charge on said capacitor means, means controlled by the holding circuit of said capacitor means for providing an output proportional to the held charge on said capacitor means, a voltage to frequency converter means operative by the output of said last mentioned means to effect a series of constant amplitude pulses of a frequency proportional to the amplitude of said operative output, a second operational amplifier means having an input connected to the alternating current sinusoidal input signal and an output, a third control means connected across the input and output of the second operational amplifier means and effective to selectively connect the second operational amplifier means in and out of operative relation for sampling the alternating current sinusoidal input signal at positive and negative peaks thereof, flip-flop means operatively connected in the output of the second operational amplifier means to provide a control output of one sense upon the alternating current sinusoidal input signal being of one phase and an output control signal of an opposite sense upon the alternating current sinusoidal input signal being of an opposite phase, a counter means operative by the series of signal pulses at the output of the voltage to frequency converter, and said counter means being controlled by the output control signals from the flip-flop means in a sense dependent upon the phase of the alternating current sinusoidal input signal so as to provide said first mentioned output.

7. The combination defined by claim 6 in which the means controlled by the holding circuit of said capacitor means includes a field effect transistor having a control input connected in the holding circuit operative to cause the field effect transistor to provide an output proportional to the held voltage of said capacitor means.

8. The combination defined by claim 6 including a clock driver buffer network means operative in synchronism with the frequency of the alterating current sinusoidal input signal for controlling the first, second and third control means in such a manner that the counter means is effective to provide said first mentioned output.

9. The combination comprising an operational amplifier having an input operatively connected to an alternating current sinusoidal signal of variable amplitude and of a reversible phase, first control means operative in one sense for selectively rendering the first operational amplifier means effective to amplify and thereby sample the sinusoidal signal, said first operational amplifier means having an output, a capacitor means connected in the output of the first operational amplifier means, a second control means to selectively permit the capacitor means to be charged by the output of the first operational amplifier means, said second control means being selectively operative in another sense to render effective a holding circuit to hold the charge on the capacitor means by operation of the first operational amplifier means upon the first control means being operated in another sense to selectively render the first operational amplifier means ineffective to amplify said signal, and the holding circuit for the capacitor means including a field effect transistor means controlled by the held charge on the capacitor means to effect an output proportional to the held charge on the capacitor means, and a voltage to frequency converter means operatively connected to the output of the field effect transistor means and operative to provide a series of constant amplitude pulses having a frequency proportional to the amplitude of the held charge on the capacitor means.

10. The combination defined by claim 9 including means responsive to the series of output pulses from the voltage to frequency converter to provide an output of magnitude proportional to a mathematical integral of the amplitude of the input signal.

11. An integrator system comprising a first operational amplitude and of reversible phase, first control means for to an alternating current sinusoidal signal of variable amplitude and of reversible phase, first control means for selectively rendering the first operational amplifier means effective to amplify and thereby sample the signal, said first operational amplifier means having an output, a capacitor means, a second control means selectively operable in one sense to permit the capacitor means to be charged by the output of the first operational amplifier means, said second control means being selectively operable in another sense to hold the charge on the capacitor means in a holding circuit upon the first operational amplifier means being rendered ineffective by the first control means, the holding circuit for the capacitor means including auxiliary means controlled by the held charge on the capacitor means to effect an output of a magnitude proportional to the held charge on the capacitor means, a voltage to frequency converter means operatively connected to the output of the auxiliary means and operative to provide a series of output pulses of a frequency proportional to the magnitude of the output from the auxiliary means, counter means for algebraically summing the series of output pulses, a second operational amplifier means having an input operatively connected to the alternating current sinusoidal signal, a third control means for periodically rendering the second operational amplifier means effective to amplify and thereby sample the signal, said second operational amplifier means having an output, means operatively connected in the output of the second amplifier means and responsive to the phase of the sinusoidal signal to control the algebraic summing of the output pulses by the counter means in negative and positive senses dependent upon the phase of the alternating current sinusoidal signal.

12. The combination defined by claim 11 including means operative in synchronism with the frequency of the alternating current sinusoidal signal for controlling the first, second and third control means so as to cause the counter means to provide an output of a magnitude proportional to a mathematical integral of the amplitude of the signal.

13. An integrator system comprising means for periodically sampling an alternating current sinusoidal signal of variable amplitude to provide a sample voltage, said means being effective to sample said signal at a peak of the sinusoidal signal and once for each cycle of the sinusoidal signal, means for storing the sample voltage provided by the sampling means, a voltage to frequency converter means, means controlled by said storing means to cause said voltage to frequency converter means to provide a series of output pulses of a frequency variable in response to the amplitude of the stored sample voltage and hence to the amplitude of the signal, and counting means for algebraically summing the output pulses of said converter means so as to provide an output of a magnitude proportional to a mathematical integral of the amplitude of the signal.

14. An integrator system comprising first means for periodically sampling an alternating current sinusoidal signal of variable amplitude and of reversible phase to provide a sample voltage, said first means being effective to sample said signal at a peak of the sinusoidal signal and once for each cycle of the sinusoidal signal, means for storing the sample voltage provided by the first sampling means and providing a direct current biasing signal voltage corresponding to the amplitude of the sample voltage, a voltage to frequency converter means, means controlled by said storing means and responsive to the direct current biasing signal voltage provided by said storing means to cause said voltage to frequency converter to provide a series of output pulses of a frequency proportional to the amplitude of the biasing signal voltage and hence proportional to the amplitude of a preceding sample voltage, counting means for algebraically summing the output pulses of said converter means so as to provide an output of a magnitude proportional to a mathematical integral of the amplitude of the signal, a second means for periodically sampling the alternating current sinusoidal signal, said second means being effective to sample said signal at positive and negative peaks of the sinusoidal signal so as to selectively provide a first control output of one waveform indicative of one phase relation of the sinusoidal signal and alternately a second control output of another waveform indicative of an opposite phase relation of the sinusoidal signal, and means for operatively connecting said first and second control outputs to the counting means so as to control the summing of the output pulses of said converter means in positive and negative senses dependent upon the phase relation of the alternating current sinusoidal signal.

15. An integrator system comprising means for periodically sampling an alternating current sinusoidal signal of variable amplitude to provide a sample voltage, control means operable in one sense to render said sampling means effective to sample said signal only once each cycle and at a selected peak of the sinusoidal signal, means for storing the sample voltage provided by the sampling means, said storing means being rendered effective upon operation of said control means in said one sense for accepting the sample voltage, and said storing means being rendered effective upon operation of said control means in another sense for providing a direct current output biasing signal voltage corresponding to the amplitude of the sample voltage, a voltage to frequency converter means, means to supply a variable control output to said voltage to frequency converter means, said variable control output supply means being operable in response to said biasing signal voltage provided by said storing means to operate said voltage to frequency converter means so as to provide a series of constant amplitude output pulses of a frequency proportional to the magnitude of the stored sample voltage, and counting means for algebraically summing the output pulses of said converter means so as to provide an output of a magnitude proportional to a mathematical integral of the amplitude of the signal.

16. An integrator system comprising means for periodically sampling an alternating current sinusoidal signal of variable amplitude and of reversible phase to provide a sample voltage, control means operable in one sense to render said sampling means effective to sample said signal only once each cycle and at a selected peak of the sinusoidal signal, means for storing the sample voltage provided by the sampling means, said storing means being rendered effective by the operation of said control means in said one sense, a voltage to frequency converter means, said control means being operable in another sense to render said storing means effective to operate said voltage to frequency converter means so as to provide a series of constant amplitude output pulses of a frequency proportional to the magnitude of the stored sample voltage, counting means for algebraically summing the output pulses of said converter means so as to provide an output of a magnitude proportional to a mathematical integral of the amplitude of the signal, other means for periodically sampling the alternating current sinusoidal signal, other control means selectively operable to render said other sampling means effective to sample said signal at positive and negative peaks of the sinusoidal signal so as to provide a first output control voltage of one waveform upon the sinusoidal signal having one phase relation and alternately providing a second output control voltage of another waveform upon the sinusoidal signal having an opposite phase relation, means for selectively operating the first mentioned control means in said one sense, said selective operating means being controlled by said output control voltages so as to render said first mentioned control means effective to select the peak of the sinusoidal signal sampled by the first mentioned sampling means in response to an existing phase relation of the sinusoidal signal, means for controlling the algebraic summing of the output pulses of said converter means by said counting means in positive and negative senses, and means for operatively connecting said output control voltages to said summing control means so as to render said counting means selectively effective in said positive and negative senses dependent upon the phase relation of the alternating current sinusoidal signal.

17. An integrator system comprising first means for periodically sampling an alternating current sinusoidal signal of variable amplitude and of reversible phase to provide a first sample voltage, said first means being effective to sample said signal at a peak of the sinusoidal signal and once each cycle of the sinusoidal signal, second means for periodically sampling negative and positive peaks of the alternating current sinusoidal signal, means operable by said second sampling means for selecting the peak of the sinusoidal signal to be sampled by the first sampling means in response to the phase condition of the alternating current sinusoidal signal sampled by the second sampling means, means for storing the sample voltage provided by the first sampling means, a voltage to frequency converter means operative by said storing means and effective to provide a series of output pulses of a frequency proportional to the amplitude of the stored sample voltage, counting means for algebraically summing the output pulses of said converter means, other means operable by said second sampling means for controlling in positive and negative senses the summing of said output pulses by said counting means so as to provide an output of a magnitude proportional to a mathematical integral of the amplitude of the signal.

18. An integrator system comprising a first operational amplifier means having an input operatively connected to an alternating current sinusoidal signal of variable amplitude and of reversible phase, first control means for selectively rendering the first operational amplifier means effective to amplify and thereby sample the signal, said first operational amplifier means having an output, a capacitor means connected in the output of the first operational amplifier means, a second control means selectively operable in one sense to permit the capacitor means to be charged by the output of the first operational amplifier means, said second control means being selectively operable in another sense to hold the charge on the capacitor means in a holding circuit upon the first operational amplifier means being rendered ineffective by the first control means, a field effect transistor means controlled by the held charge on the capacitor means to effect an output of a magnitude proportional to the held charge on the capacitor means, a voltage to frequency converter means operatively connected to the output of the field effect transistor means and operative to provide a series of output pulses of a frequency proportional to the magnitude of the output from the field effect transistor means, means to count the series of output pulses from the converter, a second operational amplifier means having an input operatively connected to the alternating current sinusoidal signal, a third control means for periodically rendering the second operational amplifier means effective to amplify and thereby sample the signal, said second operational amplifier means having an output, a first clock driver network having an input and first and second outputs, the input of said first clock driver network being connected to the output of said second operational amplifier means, said first and second outputs of the first clock driver network each providing output pulses corresponding to alternate peaks of the sinusoidal signal sampled by said second operational amplifier means, a second clock driver network having an input connected to the first output of said first clock driver network, reference voltage supply means operative in synchronism with the frequency of the alternating current sinusoidal signal and having an output for supplying a series of reference pulses corresponding to the peaks of the sinusoidal signal, means for combining the reference pulses at the input of the second clock driver network with the pulses from the first output of said first clock driver network, the second clock driver network having first and second outputs providing control pulses, the first output of said second clock driver network being operatively connected to the first control means so that the control pulses provided thereby may effect the periodic selective operation of the first operational amplifier means, the second output of the second clock driver network being operatively connected to the second control means so that the control pulses provided thereby may effect the operation of the second control means in said one and other senses, a flip-flop means having an input connected to the second output of said first clock driver network, said flip-flop means having first and second outputs operatively connected to said counter means to control the algebraic summing thereby of the output pulses from the converter means in negative and positive senses dependent upon the phase of the alternating current sinusoidal signal sampled by the second operational amplifier means.

19. The combination defined by claim 18 including a third clock driver network having an input connected to the output of the reference voltage supply means and an output providing control pulses, and the output of the third clock driver network being operatively connected to the third control means so that the control pulses provided thereby may cause the third control means to periodically render the second operational amplifier means effective to sample the phase of the alternating current signal.

References Cited

UNITED STATES PATENTS

| | | |
|---|---|---|
| 2,836,794 | 5/1958 | Davis et al. |
| 3,114,885 | 12/1963 | Payne _____ 235—183 |
| 3,201,703 | 8/1965 | Becker _____ 328—151 X |
| 3,237,023 | 2/1966 | Wilhelm _____ 328—151 X |
| 3,296,613 | 1/1967 | Andersen et al. ____ 235—183 X |
| 3,328,568 | 6/1967 | Masel _____ 235—183 |
| 3,333,092 | 7/1967 | Hauser _____ 235—183 |
| 3,333,114 | 7/1967 | Molnar et al. _____ 307—229 X |

MALCOLM A. MORRISON, Primary Examiner

FELIX D. GRUBER, Assistant Examiner

U.S. Cl. X.R.

235—92; 307—229; 328—127, 151; 329—110; 331—177; 332—16; 340—347

UNITED STATES PATENT OFFICE
CERTIFICATE OF CORRECTION

Patent No. 3,465,134   Dated September 2, 1969

Inventor(s) Robert L. James

It is certified that error appears in the above-identified patent and that said Letters Patent are hereby corrected as shown below:

Claim 11, column 14, line 3 after "operational" insert -- amplifier means having an input operatively connected to an alternating current sinusoidal signal of variable -- and lines 5 and 6 delete "to an alternating current sinusoidal signal of variable amplitude and of reversible phase, first control means for".

SIGNED AND
SEALED
DEC 23 1969

(SEAL)
Attest:

Edward M. Fletcher, Jr.
Attesting Officer

WILLIAM E. SCHUYLER, JR.
Commissioner of Patents